(12) United States Patent
DiTomasso

(10) Patent No.: US 7,097,412 B2
(45) Date of Patent: Aug. 29, 2006

(54) TURBINE ENGINE BEARING SUPPORT

(75) Inventor: John C. DiTomasso, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 347 days.

(21) Appl. No.: 10/367,042

(22) Filed: Feb. 14, 2003

(65) Prior Publication Data
US 2005/0129505 A1  Jun. 16, 2005

(51) Int. Cl.
F01B 25/16 (2006.01)

(52) U.S. Cl. ............ 415/9; 415/142; 415/173.4; 415/229

(58) Field of Classification Search ........... 415/9, 415/142, 173.4, 174.4, 229
See application file for complete search history.

(56) References Cited

U.S. PATENT DOCUMENTS

| 3,494,129 | A | * | 2/1970 | Krebs et al. ............. 415/174.4 |
| 4,264,272 | A | * | 4/1981 | Weiler ..................... 415/175 |
| 5,433,584 | A | * | 7/1995 | Amin et al. ............... 415/229 |
| 5,974,782 | A | * | 11/1999 | Gerez ....................... 415/9 |
| 6,428,269 | B1 | | 8/2002 | Boratgis et al. |
| 6,447,248 | B1 | * | 9/2002 | Kastl et al. ................. 415/9 |

* cited by examiner

Primary Examiner—Theresa Trieu
(74) Attorney, Agent, or Firm—Bachman & LaPointe, P.C.

(57) ABSTRACT

A bearing support for a rotor of an aircraft turbine engine which includes a front bearing and a front bearing support and bearing strut for securely attaching the front bearing, to the aircraft turbine engine support structure, wherein the front bearing support and bearing strut are integral with the aircraft turbine engine support structure.

3 Claims, 3 Drawing Sheets

TURBINE ENGINE BEARING SUPPORT

BACKGROUND OF THE INVENTION

The present invention relates to an aircraft turbine engine bearing support which eliminates or greatly minimizes stress concentration on the joint or interface between the bearing supports and the aircraft turbine engine support structure, and provides improved stiffness at the joint or interface.

An aircraft turbine engine bearing support system includes a front bearing and a rear bearing, and a first and second bearing support for securely attaching the front bearing and the rear bearing to the aircraft turbine engine support structure. The first bearing support is generally bolted to the aircraft turbine engine support structure, the second bearing support connected to the first bearing support. U.S. Pat. No. 6,428,269 shows such a system. The bolted joint or interface creates an undesirable high stress concentration and reduces the strength of the unit.

It is highly desirable and an object of the present invention to overcome these disadvantages and provide a turbine engine bearing support that eliminates or greatly reduces high stress concentration on the joint or interface between the bearing supports and the aircraft turbine engine support structure.

A further object of the present invention is to provide a turbine engine bearing support that provides increased stiffness and improved strength.

Further objects and advantages of the present invention will appear hereinbelow.

SUMMARY OF THE INVENTION

In accordance with the present invention it has now been found that the foregoing objects and advantages are readily obtained.

The present invention comprises: an aircraft turbine engine including a rotor having a shaft which rotates about an axis of rotation during balanced engine operation; a front bearing and a bearing support structure for supporting the shaft for rotation, said bearing support structure including a front bearing support and a bearing strut for securely attaching the front bearing to the aircraft turbine engine support structure, wherein the bearing strut is integral with the turbine engine support structure, and desirably the joint or interface between the bearing strut and the aircraft turbine engine support structure is a one-piece casting. Desirably, the front bearing support is integral with the bearing strut so that the front bearing support and bearing strut are an integral unit and preferably a one-piece casting with said aircraft turbine engine support structure. Desirably, also, the front bearing support extends between the front bearing and the bearing strut so that an integral joint or interface is provided between the front bearing support, and the bearing strut and the aircraft turbine engine support structure.

Further features of the present invention will appear hereinbelow.

BRIEF DESCRIPTION

The present invention will be made readily understandable from a consideration of the following illustrative drawings, wherein.

DETAILED DESCRIPTION OF THE PREFERRED EMBODIMENTS

Figure 1:
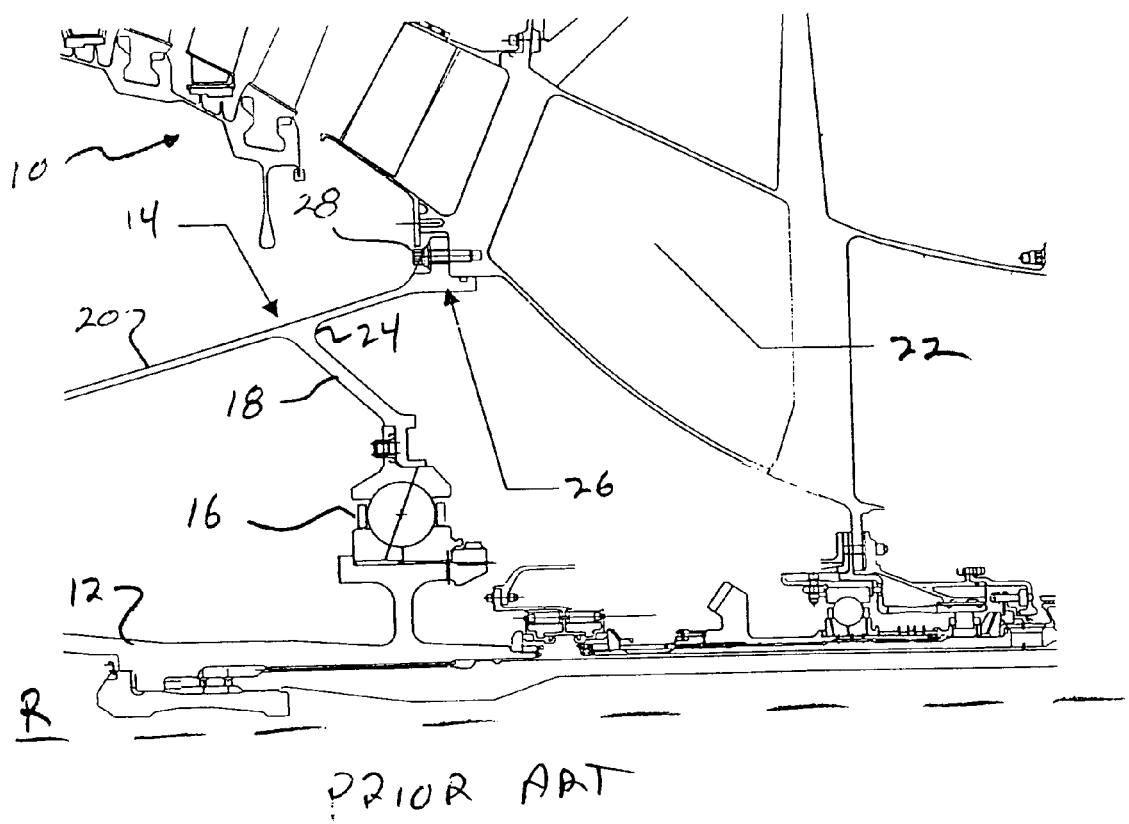
FIG. 1 is a partial sectional view illustrating a prior art aircraft turbine engine bearing support.

The present invention will be described with reference to well known aircraft turbine engines per se, with FIG. 1 showing a prior art bearing support system.

With reference to FIG. 1, a fan stage of an aircraft turbine engine 10 includes a fan stage having a fan rotor shaft 12 which rotates around a geometric axis of rotation R. The fan stage as well known includes a plurality of fan blades regularly distributed around the periphery of the rotor shaft 12.

The rotor shaft 12 is guided during normal rotation of the shaft around the geometric axis R on a bearing support system 14 which includes a front bearing 16 and a rear bearing (not shown), and a front bearing support 18 connected to a bearing support strut 20 for attaching the front bearing 16 to the engine support structure 22. The rear bearing is also connected to the bearing support system with the front bearing positioned between the engine support structure and the rear bearing.

In accordance with FIG. 1, the front bearing support 18 is connected to the bearing strut 20 at a joint 24 which is located at a distance from the joint 26 between the strut 20 and the engine support structure 22.

However, it can be clearly seen in FIG. 1 that the bearing support system is connected to the engine support structure at interface 26 by bolting 28. This results in a high stress concentration on the joint or interface between the bearing support strut and engine support structure, reduces the stiffness of the joint and decreases the strength thereof. Also, this requires a large flange and large bolts to withstand the locally high loads, with minimal distortion.

Figure 2:
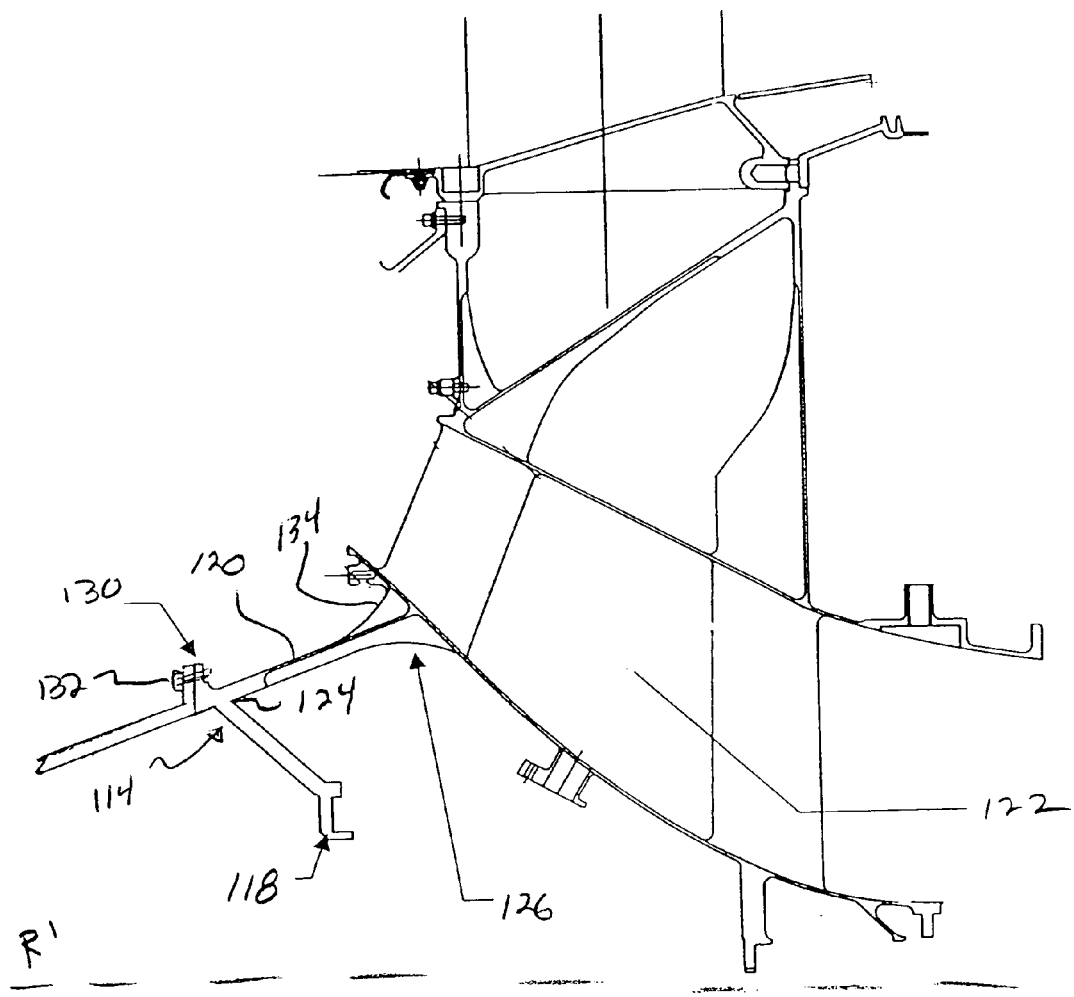
FIG. 2 is a partial sectional view similar to FIG. 1 illustrating a representative embodiment of a turbine bearing support of the present invention.
Figure 3:
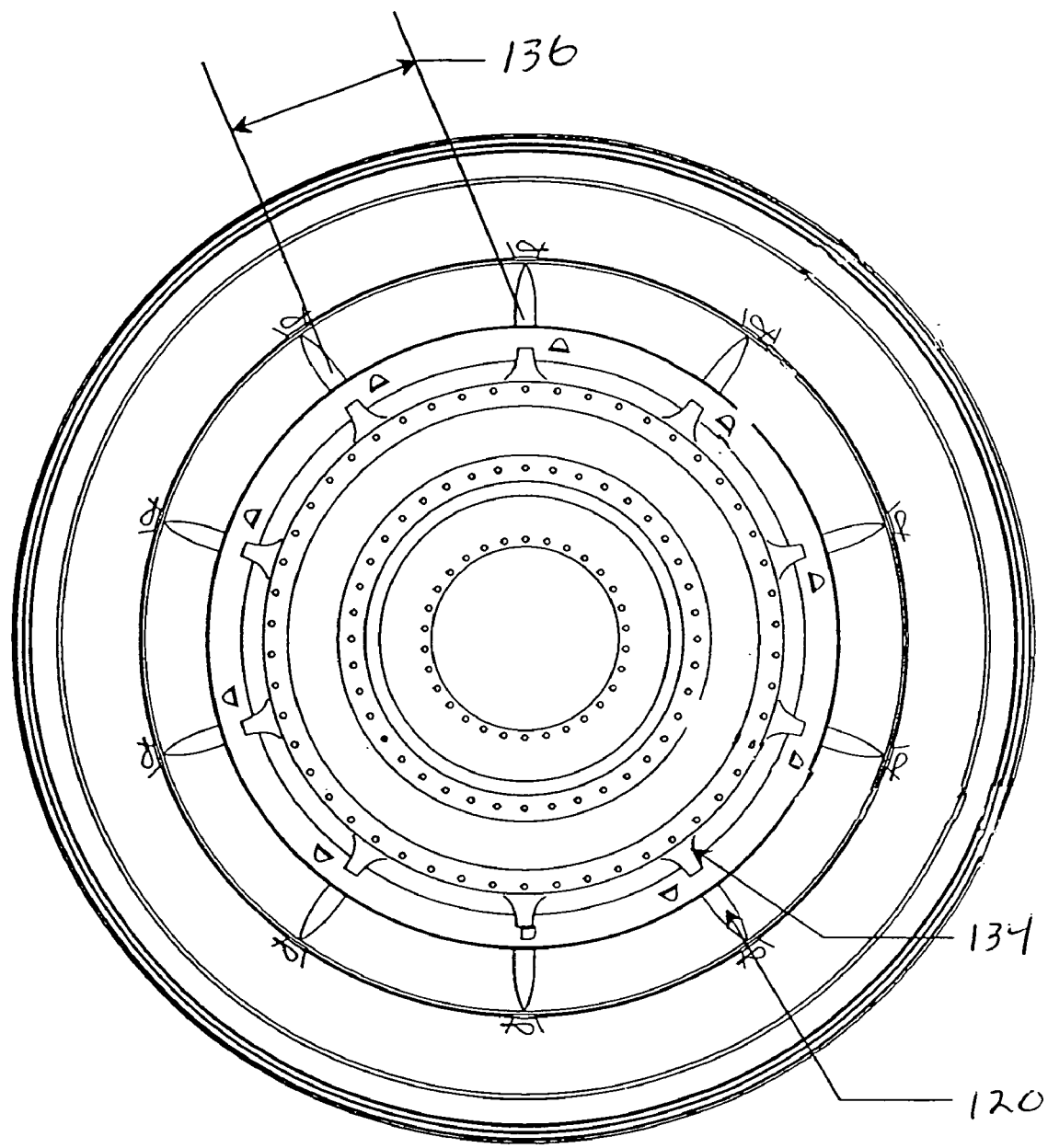
FIG. 3 is a front view of the turbine bearing support of FIG. 2.

In accordance with the structure of the present invention shown in FIG. 2, a fan stage of an aircraft turbine engine 100 is provided which is generally similar to that shown in FIG. 1.

As with FIG. 1, a rotor shaft is guided during normal rotation of the shaft around the geometric axis R' on a bearing support system 114 which includes a front bearing and a rear bearing (not shown), and a front bearing support 118 and a bearing support strut 120 for attaching the front and rear bearings to the engine support structure 122.

However, as can be clearly seen in FIG. 2, the bearing support strut 120 is integral with the turbine engine support structure 122 and the joint or interface 126 between the strut 120 and the turbine engine support structure 122 is a one-piece casting which extends outwardly from the engine support structure 122 to the front bearing support 118 at integral interface 124. Thus the front bearing support 118 is integral with the bearing strut 120, and the front bearing support and bearing strut form a one-piece casting with the aircraft turbine engine support structure 122.

As shown in FIG. 2, the front bearing support 118 extends from the front bearing to strut 120, and strut 120 extends to the engine support structure 122 and includes an integral interface or joint 126 between the strut 120 and engine support structure plus an integral interface 124 between front bearing support 118 and strut 120, which overcomes the disadvantages of the bolted joint or interface 26 of FIG. 1.

Strut flange 130 is provided on the bearing support strut 120 spaced away from the integral interface 124 between front bearing support 118 and strut 120, i.e., integral interface 124 is positioned between strut flange 130 and support structure 122. Strut flange 130 is connected together by bolt 132. By moving the bolted struct flange forward, away from the engine support structure 122 and away from the front bearing support 118, the local stresses at the strut flange are minimized, allowing a lighter flange, with smaller and/or fewer bolts. Large strut gussets 134 are used at the struts to fair the strut structure into the thin hoop structure of the bearing support. The gussets, and the fairing of the structure is not possible with the typical design. Since the gussets are local to struts, the parasitic mass between the struts is reduced. The large gussets also serve to stiffen the structure considerably, with adding minimal weight. In order to have enough room to fair the structure smoothly, the distance between the flange 130 and the engine support structure 122 should preferably be at least half the span 136 in-between struts.

The structure of the present invention provides considerable advantages. The bolted joint between the support strut and the aircraft turbine engine support structure is eliminated, which eliminates the high stress concentration on the joint by eliminating the bolted joint and provides the advantages discussed above. The fully integrated joint or interface provides a stiffer structure with higher strength. In addition, the interface between the front bearing support is integral with the strut and moved away from the engine support structure, thereby minimizing stress and increasing strength.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In an aircraft turbine engine comprising: a rotor having a shaft which rotates about an axis of rotation during balanced engine operation; a front bearing and a bearing support structure for supporting the shaft for rotation, said bearing support structure including a front bearing support and a bearing strut for securely attaching the front bearing to the aircraft turbine engine support structure, wherein the bearing strut is a one piece cast structure with a portion of the aircraft turbine engine support structure; and a strut flange with a bolted joint on the bearing strut, wherein a first integral joint is positioned between the front bearing support and the bearing strut and a second integral joint is positioned between the bolted joint and the engine support structure, and including a plurality of spaced apart struts, wherein the distance between the strut flange and the engine support structure is at least half the span in between struts.

2. The aircraft turbine engine according to claim 1, wherein said front bearing support is a one piece cast structure with the bearing strut so that the front bearing support and bearing strut are an integral unit.

3. The aircraft turbine engine according to claim 1, wherein the front bearing support is connected to the bearing strut at the integral joint which is located at a distance from the engine support structure.

\* \* \* \* \*